United States Patent
Powell, IV et al.

(10) Patent No.: US 11,773,500 B2
(45) Date of Patent: Oct. 3, 2023

(54) METHOD AND APPARATUS FOR EFFICIENT METAL DISTILLATION AND RELATED PRIMARY PRODUCTION PROCESS

(71) Applicant: Worcester Polytechnic Institute, Worcester, MA (US)

(72) Inventors: Adam Clayton Powell, IV, Newton, MA (US); David Dussault, Stoneham, MA (US); Matthew Earlam, Lakewood, CO (US); Aaron Tajima, Melrose, MA (US); Connor Raymes, San Francisco, CA (US)

(73) Assignee: Worcester Polytechnic Institute, Worcester, MA (US)

( * ) Notice: Subject to any disclaimer, the term of this patent is extended or adjusted under 35 U.S.C. 154(b) by 422 days.

(21) Appl. No.: 16/944,147

(22) Filed: Jul. 31, 2020

(65) Prior Publication Data

US 2021/0040633 A1  Feb. 11, 2021

Related U.S. Application Data

(63) Continuation of application No. PCT/US2020/044360, filed on Jul. 30, 2020.

(60) Provisional application No. 62/880,322, filed on Jul. 30, 2019.

(51) Int. Cl.

| | |
|---|---|
| *B01D 1/26* | (2006.01) |
| *C25C 3/04* | (2006.01) |
| *B01D 5/00* | (2006.01) |
| *B01D 1/00* | (2006.01) |
| *C22B 26/22* | (2006.01) |

(52) U.S. Cl.
CPC ............. *C25C 3/04* (2013.01); *B01D 1/0082* (2013.01); *B01D 1/26* (2013.01); *B01D 5/006* (2013.01); *C22B 26/22* (2013.01)

(58) Field of Classification Search
CPC ...... B01D 1/0082; B01D 1/0088; B01D 1/26; B01D 3/346; B01D 3/205; B01D 5/006; C25C 3/04; C25C 3/36; C22B 26/22
See application file for complete search history.

(56) References Cited

U.S. PATENT DOCUMENTS

| | | | |
|---|---|---|---|
| 3,627,646 A | 12/1971 | Osdor | |
| 3,697,387 A * | 10/1972 | Othmer | B01D 3/148 |
| | | | 202/205 |
| 7,419,641 B2 * | 9/2008 | Laporte | B01D 3/14 |
| | | | 427/255.6 |
| 2002/0121158 A1 * | 9/2002 | Otaki | C22B 21/068 |
| | | | 75/600 |

(Continued)

OTHER PUBLICATIONS

International Search Report, PCT/US2020/0443601, dated Oct. 21, 2020, pp. 2.

*Primary Examiner* — Jonathan Miller
(74) *Attorney, Agent, or Firm* — Armis IP Law, LL

(57) ABSTRACT

Method and apparatus are provided for efficient metal distillation, and for related primary product process. Vertically stacked and gravity-driven evaporators and condensers are employed to distill metals, such metals having different volatilities. A multiple-effect thermal system of magnesium and other volatile metals is used to efficiently distill and separate metals from multiple metal alloys.

47 Claims, 13 Drawing Sheets

Schematic diagram of a four-effect magnesium G-METS distiller.

(56) References Cited

U.S. PATENT DOCUMENTS

2004/0234418 A1* 11/2004 Laporte .................. B01D 1/26
  422/502
2013/0152734 A1  6/2013 Pai et al.

* cited by examiner

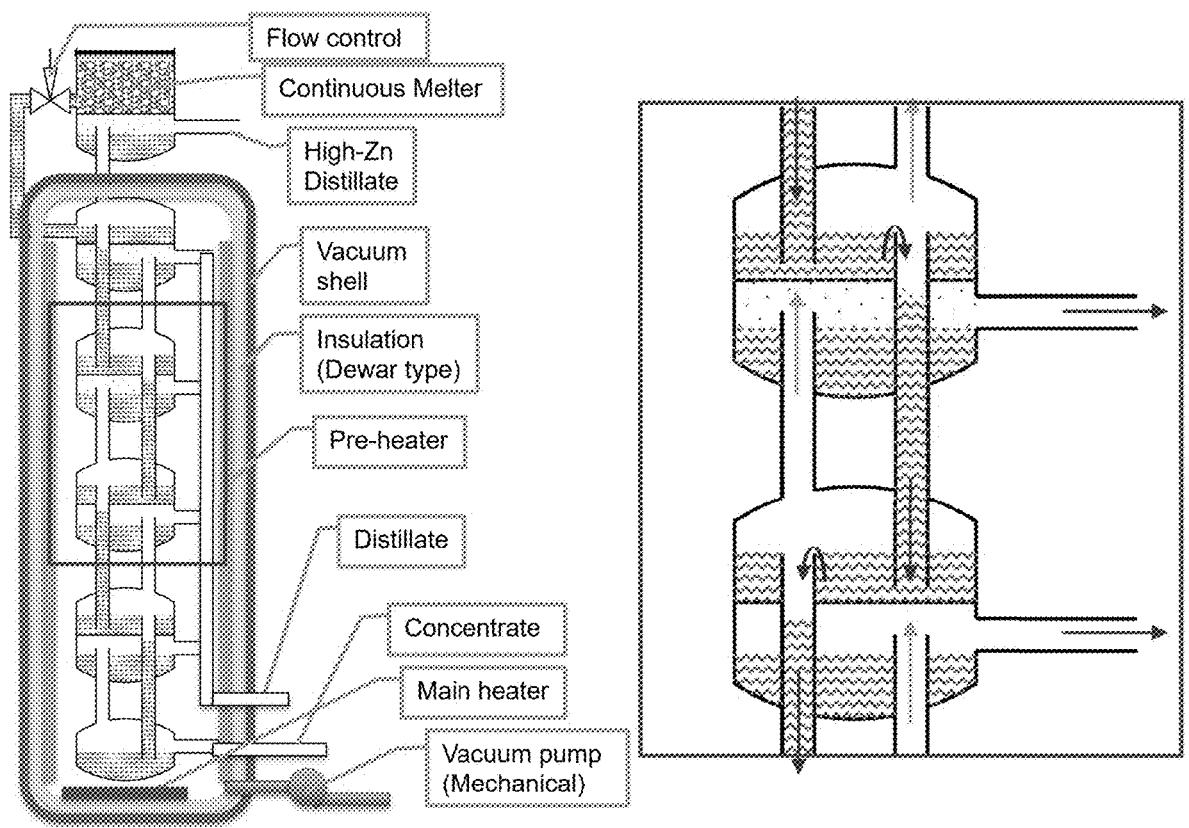
Figure 1: Schematic diagram of a four-effect magnesium G-METS distiller.
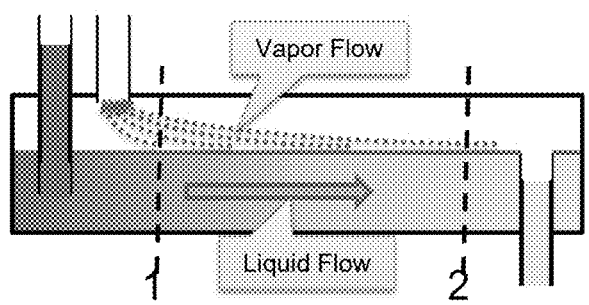
Figure 2: Schematic diagram of the counter-flow evaporator.

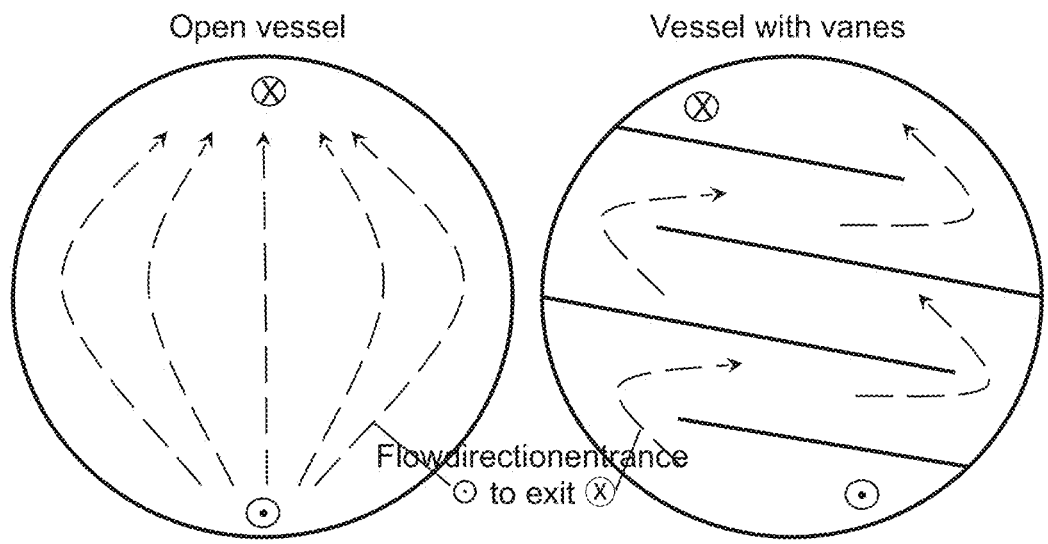
Figure 3: Use of vanes to create a tortuous flow path, enhancing plug flow.
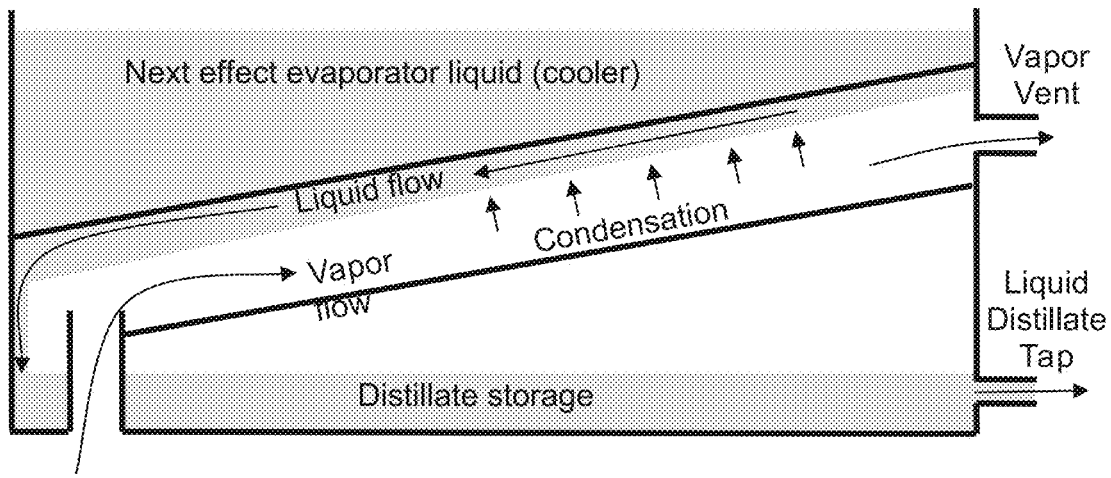
Figure 4: Vented counter-flow condenser schematic for volatile metal separation.

Figure 5: 3-effect distiller with integrated liquid metal distillate storage in condensers.

Figure 6: Use of streamline curvature to separate aerosol droplets from metal vapor.

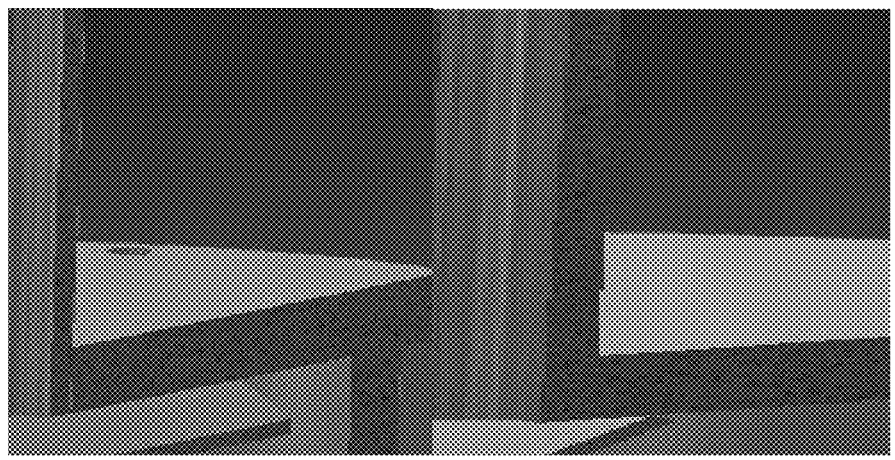
Figure 7: Two views of the angle iron "baffle" used to partially separate magnesium alloy liquid aerosol from purer Mg vapor rising out of the evaporator in Example 3.
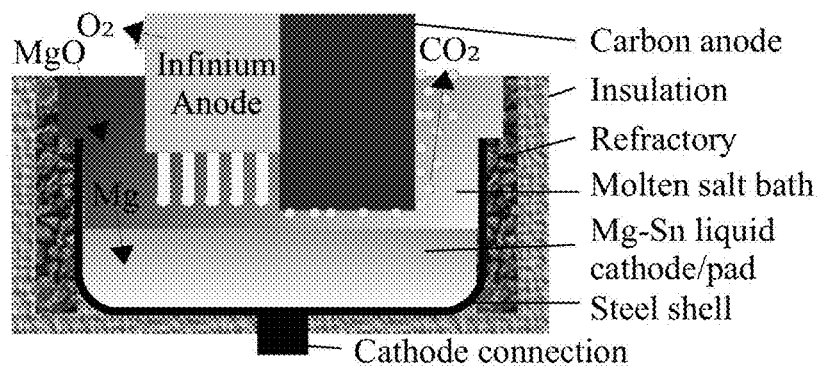
Figure 8: Schematic of a MgO reduction cell synergistic with this distillation process.

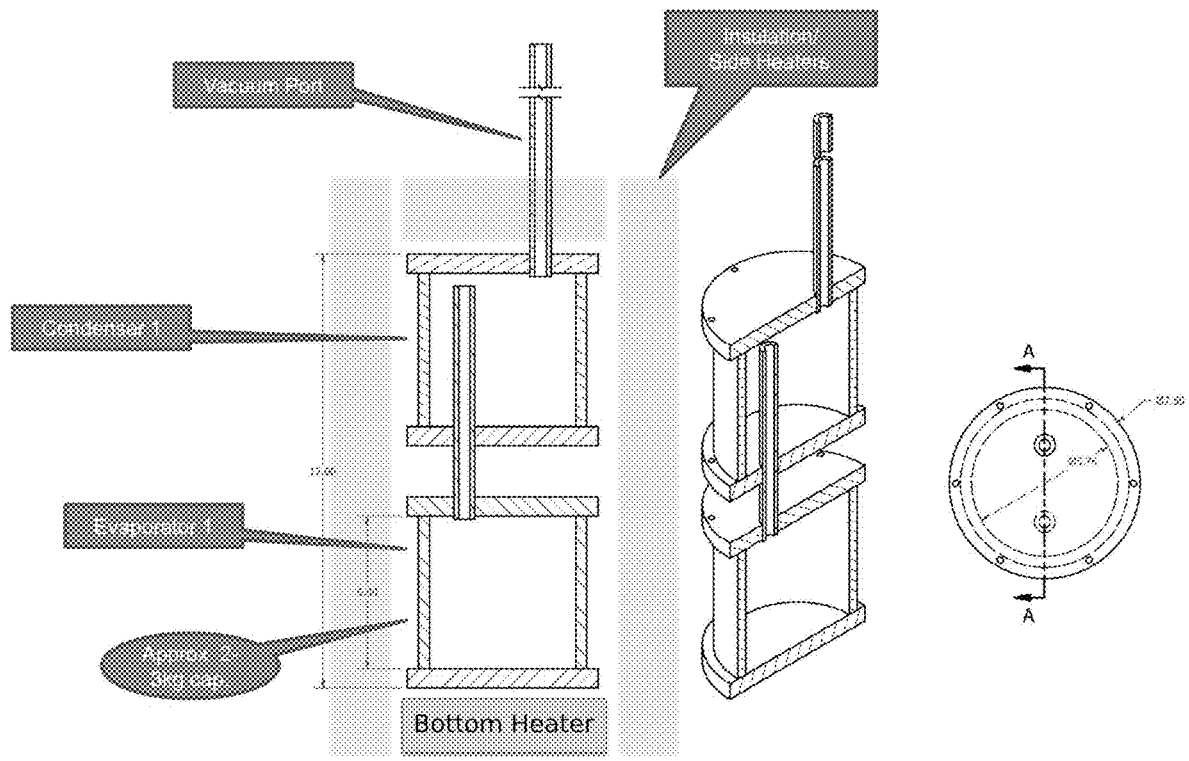
Figure 9: Design of the single-effect distiller used in Examples 1, 2 and 3.
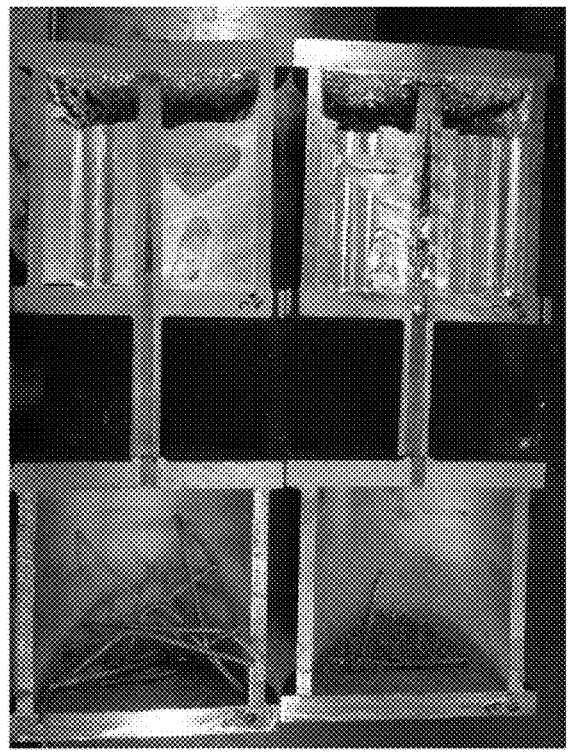
Figure 10: Distiller components after Example 2

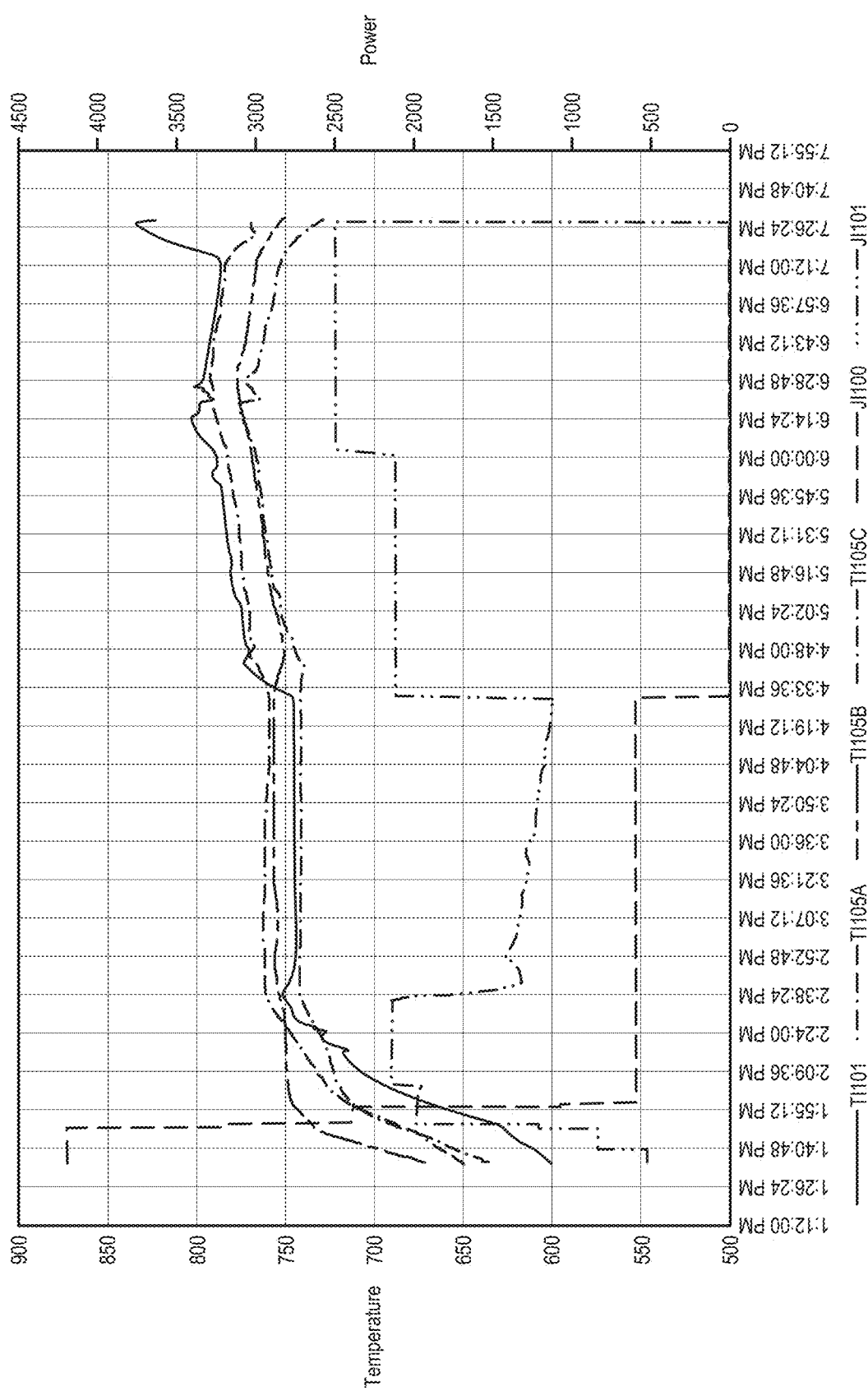
FIG. 11 Temperatures and heater power output over time in Example 3

Figure 12: Distiller components after Example 3.

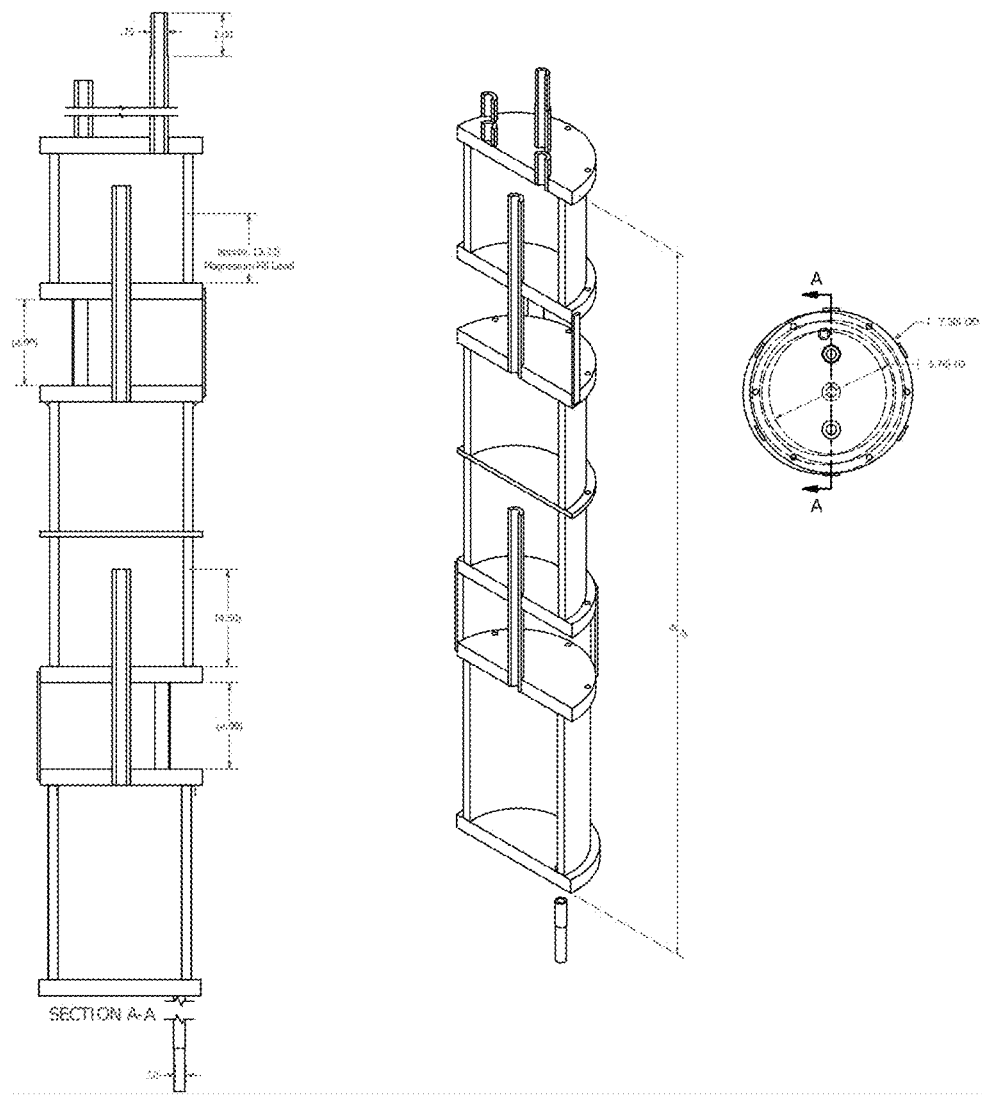
Figure 13: Design of the two-effect distiller used in Examples 4 and 5.

Figure 15: Distiller components after Example 4.

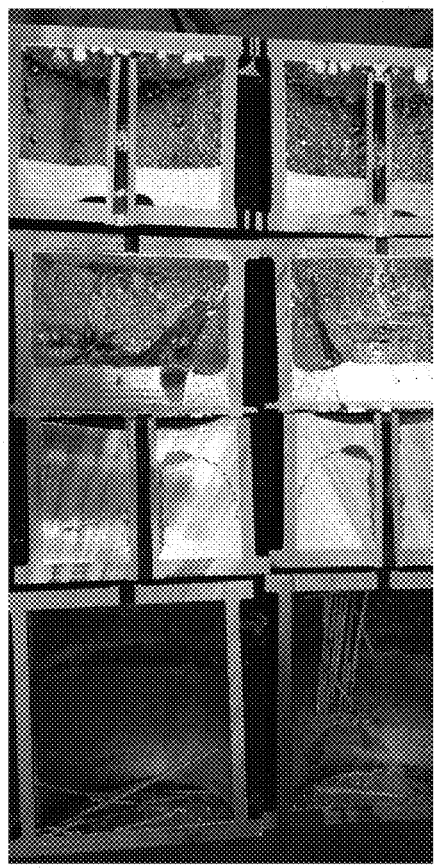
Figure 17: Distiller components after Example 5.
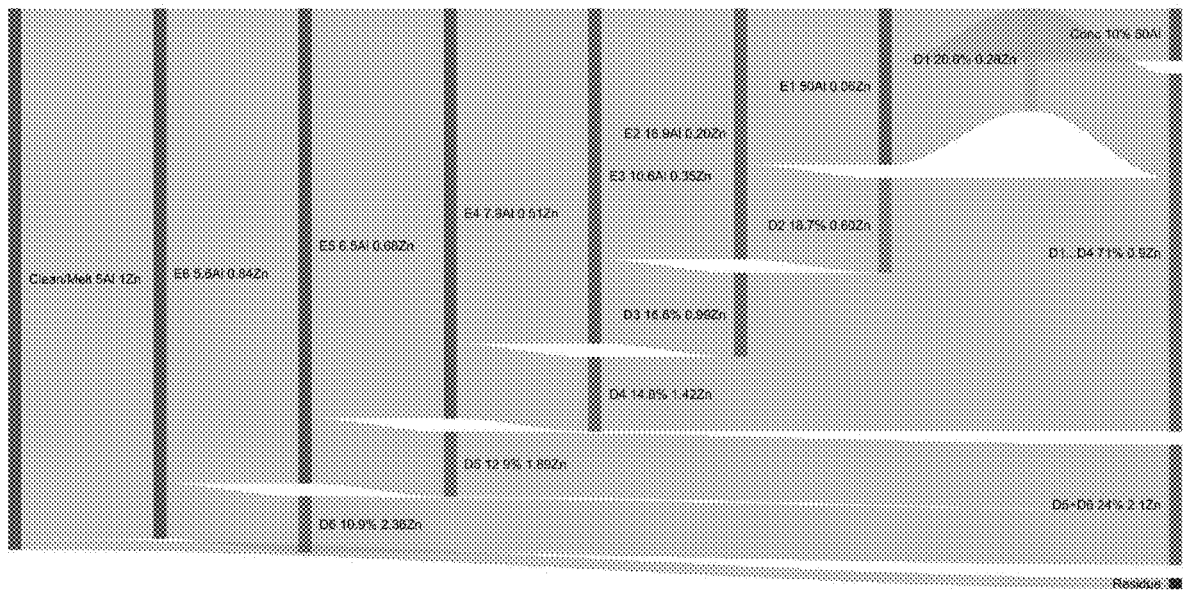
Figure 18: Simulated 6-effect distiller assuming mixed evaporators and condensers.

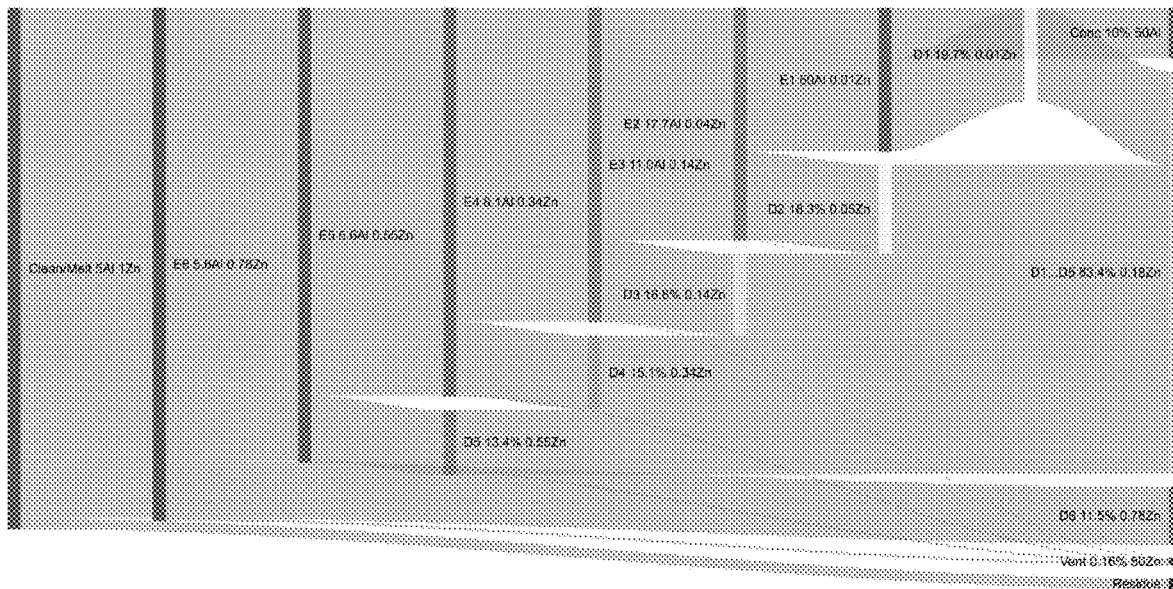
Figure 19: Simulated performance of a 6-effect distiller with counter-flow evaporators and vented counter-flow condensers.
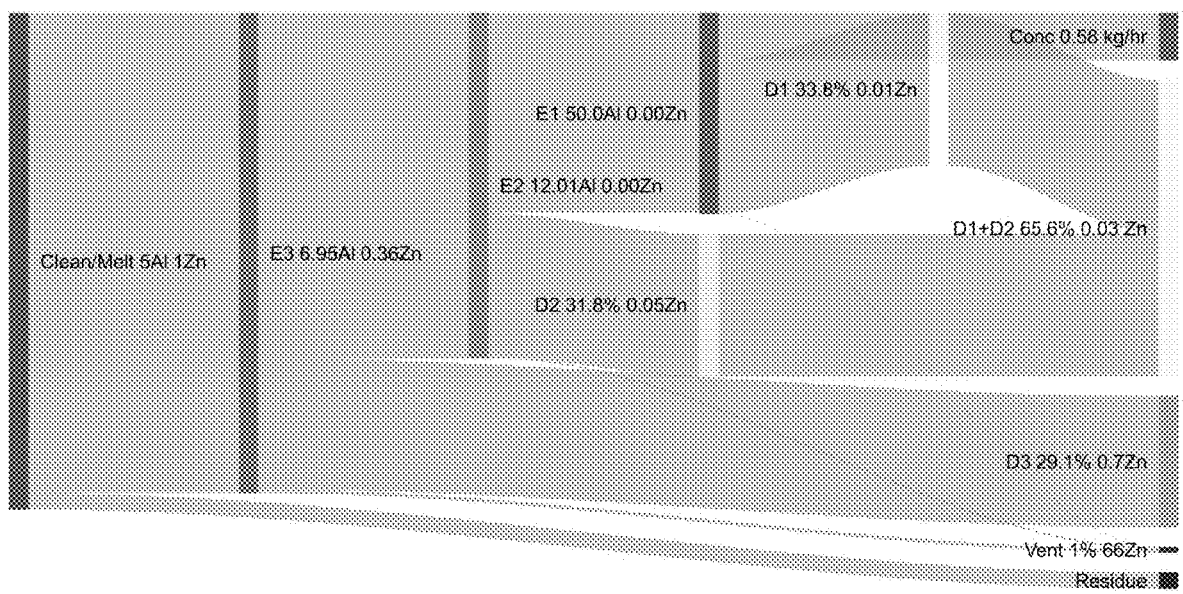
Figure 20: Simulated performance of a 3-effect distiller with counter-flow evaporators and vented counter-flow condensers.

METHOD AND APPARATUS FOR EFFICIENT METAL DISTILLATION AND RELATED PRIMARY PRODUCTION PROCESS

GOVERNMENT RIGHTS NOTICE

This invention was made with Government support under contract number DE-AR0000691 awarded by DOE, Office of ARPA-E. The Government has certain rights in this invention.

FIELD OF THE INVENTION

This invention relates to process and apparatus for distillation and refinement of metals, and more particularly, to efficient distillation in a gravity-driven multiple effect thermal system of magnesium and other volatile metals.

BACKGROUND OF THE INVENTION

Magnesium (Mg) is a low-density metal whose alloys have outstanding stiffness/weight and excellent strength/weight. It is proposed for use in very light weight high-efficiency motor vehicles. For example, in 2015 Ford and Magna demonstrated an aluminum-intensive vehicle, which they called "Mach 1", with 25% weight reduction vs. a steel baseline. Their magnesium-intensive "Mach 2" vehicle design achieved 50% lower weight, though in practice would probably be 40-45% lighter than the steel baseline.

Current barriers to widespread vehicle use of magnesium can be summarized as:
Low-cost low-emissions primary production method suitable for OECD or similar labor and environmental regulatory framework for supply and cost stability;
Recycling method capable of producing low-iron low-copper low-nickel magnesium from post-consumer scrap;
Improved corrosion resistance;
Joining technology, particularly to steel or aluminum with low joint corrosion;
Cold- or warm-formable magnesium alloy sheet;
Commercial manufacture of large magnesium alloy die castings.

The separation technology disclosed here addresses the first and second barriers above. For the second (recycling), this technology can dramatically reduce the concentrations of copper and nickel in magnesium metal, and thus can treat postconsumer Mg alloys to produce material suitable for low-corrosion high-ductility Mg alloys. For the first (primary production), this enables direct reduction of magnesium oxide (MgO) in a Hall-Héroult type cell with a dense reactive liquid metal cathode to make an alloy, then separation of pure magnesium from the alloy and returning the host metal to the electrolysis cell. Modeled production cost per kg is comparable to or below that of aluminum, though today's magnesium price is higher than that of aluminum; lower magnesium part mass vs. aluminum would add to reduced magnesium part cost.

SUMMARY OF THE INVENTION

This invention uses efficient distillation, in which the heat released in condensation provides much of the heat required for evaporation. This is achieved by operating the condenser at higher pressure than the evaporator, such that the boiling point is higher in the condenser, and heat flows from the higher-temperature condenser to the lower-temperature evaporator. This invention uses gravity to create this pressure difference. That is, the weight of a column of liquid metal raises the pressure in the evaporating chamber below it, and thus raises the pressure in the condenser connected with the lower evaporating chamber.

This concept is not new, indeed, several inventions make use of it: U.S. Pat. No. 1,069,829 to Thoens and Shears, "Multiple Still", Aug. 12, 1913; U.S. Pat. No. 3,536,591 to Lotz, "Multiple Effect Distillation Apparatus", Jul. 2, 1962; U.S. Pat. No. 5,094,721 to Petrek, "Multiple Effect Evaporation System and Process", Apr. 23, 1990; U.S. Pat. No. 5,853,549 to Sephton, "Desalination of Seawater by Evaporation in a Multi-Stack Array of Vertical Tube Bundles, with Waste Heat", Dec. 29, 1998; and U.S. Pat. No. 6,080,273 to Schrems, "Method and Device for Treating Liquids by Partial Evaporation", Jun. 27, 2000. There are entire patent classifications based on this principle, for example, B01D1/26 "Multiple effect evaporating", B01D1/0088 "Cascade evaporators". In a close parallel to this invention (U.S. Pat. No. 5,094,721), a water distiller uses vertical drain pipes between effects to achieve the desired pressure difference. Standpipes control liquid level in each evaporator. In that invention, the evaporator and condenser of a given effect form a single chamber, with water condensing on the ceiling surface. That ceiling is a conical shell, above which rests the liquid in the evaporator of the next effect, so heat is transferred from condensing water through the shell to the evaporator above it, in the next effect. Condensed water flows downward and radially outward along the bottom surface of the conical shell.

Magnesium distillation is also not new: of the approximately 2,261 patents and applications in patent classification C22B26/22, 286 involve distillation. Given the high vapor pressure of magnesium at its melting point, it can be challenging to condense as a liquid, particularly when partially diluted by an inert gas: see U.S. Pat. No. 7,641,711 to Schoukens, Curr, Abdellatif, Whyte, "Metal vapour condensation and liquid metal withdrawal", and U.S. Pat. No. 8,617,457 to Powell, Pati, Douglas, Derezinski, Spirigliozzi, Buchman, and Eagar, "Apparatus and method for condensing metal vapor", which describe liquid Mg condensers which operate with inert gas. In addition, high temperature generally leads to low energy efficiency, with distillers using 5-7 kWh/kg Mg product, cf. 1.5 kWh/kg enthalpy of vaporization. See A. Ditze and C. Scharf, Recycling of Magnesium, 2008, ISBN 3897209578, 9783897209572.

This invention combines these two principles of metal distillation and gravity-driven multiple effect thermal system ("G-METS") distillers. It includes several novel features uniquely suited to magnesium which are not addressed in prior literature on general distillation nor on magnesium distillation.

Though this invention description illustratively describes distillation of magnesium, the invention is also useful for distillation of other volatile metals such as zinc, calcium, lithium, mercury, lead, and many others.

In one aspect, the present invention comprises an apparatus for distilling a liquid metal, the apparatus comprising a plurality of two or more evaporators, for containing a liquid metal and a metal vapor in each of the evaporators, and a plurality of two or more condensers, for containing a distillate metal liquid and metal vapor in each of the condensers, arranged in succession vertically, comprising a lowest evaporator and an uppermost evaporator; and at least one liquid flow tube connecting each evaporator to the evaporator that is next below it, where the evaporators are referred to as an upper evaporator and a lower evaporator with regard to each liquid flow tube; and where each such liquid flow tube has an upper opening in the upper evaporator with regard to that liquid flow tube and a lower opening in the lower evaporator with regard to that liquid flow tube; and where a first evaporator is both below a second evaporator and connected to the second evaporator with a first liquid flow tube, and where the first evaporator is above a third evaporator and connected to the third evaporator with a second liquid flow tube, the lower opening of that first liquid flow tube in the first evaporator is below the upper opening of the second liquid flow tube in the first evaporator; and wherein at least one vapor flow tube connects each condenser to one of the plurality of evaporators below that condenser, and with each condenser in thermal communication with one of the plurality of evaporators above the evaporator in vapor flow connection to that condenser; and wherein a heater is configured to provide heat to the lowest evaporator of the plurality of evaporators.

In one aspect, the present invention comprises an apparatus in which the lowest evaporator further comprises a temperature-measuring-device.

In one aspect, the present invention comprises an apparatus in which the uppermost evaporator further comprises a temperature-measuring-device.

In one aspect, the present invention comprises an apparatus in which a liquid concentrate vessel is below and connected to the lowest evaporator, which lowest evaporator is connected to a condenser.

In one aspect, the present invention comprises an apparatus further comprising an outer chamber having an inside and an outside, in which the plurality of evaporators and the plurality of condensers are enclosed in the outer chamber.

In one aspect, the present invention comprises an apparatus in which the outer chamber comprises a means of reducing pressure below 0.5 atm.

In one aspect, the present invention comprises an apparatus in which the outer chamber comprises a means of restricting heat flow.

In one aspect, the present invention comprises an apparatus further comprising a plurality of distillate tubes connecting a plurality of condensers inside the outer chamber to a plurality of points outside the outer chamber.

In one aspect, the present invention comprises an apparatus further comprising a heater outside of the outer chamber, in which at least one of the distillate tubes connecting from a condenser to at least one point outside the outer chamber is configured with the heater, which heater is configured to provide heat to the distillate tube.

In one aspect, the present invention comprises an apparatus further comprising a plurality of valves connecting the uppermost evaporator to the outside of the outer chamber, wherein the plurality of valves are configured to control flow of the liquid metal into the uppermost evaporator.

In one aspect, the present invention comprises an apparatus further comprising a multi-gated assembly comprising at least one conduit and at least two reversibly openable gates for blocking the conduit, which multi-gated assembly enables periodic flow of liquid or solid metal from outside the outer chamber to the uppermost evaporator, and wherein at least one of the gates is closed at all times.

In one aspect, the present invention comprises an apparatus further comprising a means of controlling a rate of flow down the liquid flow tube between the uppermost evaporator and the next evaporator below the uppermost condenser.

In one aspect, the present invention comprises an apparatus in which one or more of the vapor flow tubes further comprises at least one flow device which increases a curvature of the flow of the metal vapor.

In one aspect, the present invention comprises an apparatus in which a plurality of the evaporators include a plurality of path complicators for guiding a flow of the liquid metal and the metal vapor in a manner which increases an effective length of the liquid metal and metal vapor flow path.

In one aspect, the present invention comprises an apparatus in which a plurality of the condensers include a plurality of plates for guiding flow of the distillate metal liquid and the metal vapor in a manner which increases an effective length of a flow path of the liquid metal and the metal vapor, and the apparatus further comprises an exit vent tube.

In one aspect, the present invention comprises an apparatus in which a heat sink is in thermal contact with the uppermost evaporator.

In one aspect, the present invention comprises an apparatus in which the heat sink contains a plurality of a liquid metal.

In one aspect, the present invention comprises an apparatus in which the heat sink further comprises a melter.

In one aspect, the present invention comprises a method of distilling a metal using a plurality of vessels, in which a metal alloy is introduced into a top alloy-containing vessel, then caused to flow down a first liquid flow tube into an uppermost evaporator of at least two evaporators, with at least an uppermost evaporator and at least a lowest evaporator, then caused to flow down a second liquid flow tube into a second evaporator, and wherein from the uppermost evaporator one or more metals preferentially evaporates into a metal vapor and flows into a first condenser where the metal vapor condenses and is stored as a liquid metal distillate having a temperature, and wherein from the second evaporator one or more metals preferentially evaporates into a metal vapor and flows into a second condenser where the metal vapor condenses and is stored as a liquid metal distillate having a temperature, and where as each metal vapor condenses in a condenser, the metal vapor transfers heat into the evaporator adjacent to the condenser, with heat primarily being transferred to the uppermost of the evaporators and cascading upward from each condenser to evaporator to provide heat for vaporization for all of the evaporators.

In one aspect, the present invention comprises a method in which the lowest distillate temperature is at least 400° C.

In one aspect, the present invention comprises a method in which the metal alloy introduced is at least 50 mol % magnesium.

In one aspect, the present invention comprises a method in which the metal alloy introduced is at least 50 mol % a metal selected from a list comprising zinc, cadmium, tellurium, thallium, or bismuth.

In one aspect, the present invention comprises a method in which the metal alloy introduced is at least 50 mol % a metal selected from a list comprising lithium, sodium, potassium, calcium, strontium, or barium.

In one aspect, the present invention comprises a method in which the metal alloy introduced is at least 50 mol % a metal selected from a list comprising samarium, europium, or ytterbium.

In one aspect, the present invention comprises a method in which a heater is configured to provide heat to the lowest evaporator, and the heat supplied by the heater is controlled to maintain a temperature within ±20° C. of a temperature setpoint in the lowest evaporator.

In one aspect, the present invention comprises a method in which the lowest evaporator is connected to an alloy concentrate storage vessel by a concentrate liquid flow tube.

In one aspect, the present invention comprises a method in which a rate of flow of liquid metal alloy from the top alloy-containing vessel through one or more top liquid flow tubes to the first evaporator is controlled by a valve or tube concentric with each top liquid flow tube, with a temperature-measuring-device in the first evaporator, to maintain a desired first evaporator temperature setpoint.

In one aspect, the present invention comprises a method in which a chamber enclosing the evaporators and condensers, and a pump connected to the chamber maintain a pressure inside the chamber below 0.2 atm.

In one aspect, the present invention comprises a method in which the chamber enclosing the evaporators and condensers uses a plurality of insulating materials to reduce heat flow from the evaporators and condensers to outside the chamber.

In one aspect, the present invention comprises a method further comprising introducing solid metal into the uppermost evaporator through a multi-gated assembly.

In one aspect, the present invention comprises a method in which the liquid metal distillate is removed from one or more condensers through one or more distillate tubes configured with at least one heater on a cold section of one or more distillate tubes, such that turning on the at least one heater melts frozen metal in the one or more distillate tubes and allows the liquid metal distillate to flow out of the one or more condensers.

In one aspect, the present invention comprises a method in which liquid metal alloy concentrate is removed from the alloy concentrate storage vessel through one or more concentrate tubes configured with at least one heater on a cold section of the concentrate tubes, such that turning on the at least one heater melts frozen metal in the concentrate tubes and allows liquid metal alloy concentrate to flow out of the alloy concentrate storage vessel.

In one aspect, the present invention comprises a method in which the metal vapor from at least one evaporator to at least one condenser is made to flow through a high-curvature device at a velocity sufficient that small entrained liquid metal alloy droplets are separated from the metal vapor.

In one aspect, the present invention comprises a method in which one or more evaporators comprise a tortuous flow path to increase an effective flow path length in the evaporator of the liquid metal alloy and of the metal vapor.

In one aspect, the present invention comprises a method in which one or more condensers comprise a tortuous flow path to increase an effective flow path length in the condenser of the distillate metal liquid and of the metal vapor.

In one aspect, the present invention comprises a method in which a level of the liquid metal in one or more of the plurality of vessels is estimated by measuring an electrical resistance between at least two points on one of the plurality of vessels.

In one aspect, the present invention comprises a method in which a level of the liquid metal in one or more of the plurality of vessels is estimated by measuring an electrical resistance between at least two points on one of the plurality of vessels.

In one aspect, the present invention comprises a process for producing a first metal by electrolysis of an oxide of the first metal in an electrolysis cell comprising a liquid mixture of halide salts and oxides, by applying a direct current potential between at least one anode and at least one cathode, and adding the oxide of the first metal to the liquid mixture of halide salts, with a dense liquid including a second metal at least one cathode such that an alloy forms at the cathode comprising the first and second metals at the cathode, then removing the alloy including the first and second metals from the electrolysis cell, and using distillation to remove a portion of the first metal from the alloy including the first and second metals, where the distillation evaporates a portion of the first metal and uses a heat released in condensation of the first metal to provide at least 30% of the heat required for evaporation of the first metal.

In one aspect, the present invention comprises a process in which a plurality of the alloy including the first and second metals is returned to the electrolysis cell cathode.

In one aspect, the present invention comprises a process in which a plurality of impurity metals are removed from the alloy including the first and second metals, by introducing the alloy into a separation vessel, reducing a temperature of the alloy by at least 50° C., and maintaining the alloy in the vessel for a period of time in which a plurality of the impurity metal separate from the alloy as a plurality of impurity metal solids, then removing the alloy, from which the plurality of the impurity metal solids separated, from the separation vessel.

In one aspect, the present invention comprises a process in which the separation vessel is rotated in order to enhance a rate of solid impurity metal separation.

In one aspect, the present invention comprises a process in which some impurity metals are removed from the alloy including the first and second metals by reducing its temperature by at least 50° C. and using a filter or sieve to remove a plurality of impurity metal solids.

In one aspect, the present invention comprises a process in which the second metal is selected from a list comprising copper, gallium, germanium, silver, indium, tin, antimony, thallium, lead, or bismuth.

In one aspect, the present invention comprises a process in which the second metal is selected from a list comprising indium, tin, antimony, lead, or bismuth.

In one aspect, the present invention comprises a process in which the first metal is selected from a list comprising lithium, sodium, potassium, magnesium, calcium, strontium, or barium.

In one aspect, the present invention comprises a process in which the first metal is selected from a list comprising zinc, cadmium, tellurium, thallium, or bismuth.

In one aspect, the present invention comprises a process in which the first metal is selected from a list comprising samarium, europium, or ytterbium.

BRIEF DESCRIPTION OF THE DRAWINGS

The foregoing summary, as well as the following detailed description of various aspects, is better understood when read in conjunction with the appended drawings. For the purposes of illustration, the drawings show exemplary aspects; but the presently disclosed subject matter is not limited to the specific methods and instrumentalities disclosed. In the drawings, like reference characters generally refer to the same components or steps of the device throughout the different figures. In the following detailed description, various aspects of the present invention are described with reference to the following drawings, in which:

FIG. 1A shows a schematic view of an aspect of the apparatus of the present disclosure.

FIG. 1B shows a schematic view of the detail shown in FIG. 1A showing a portion of the apparatus of the present invention.

FIG. 2 shows a schematic view of an aspect of an evaporator of the present disclosure.

FIG. 3 shows schematic views of a horizontal cross section of an evaporator or condenser of the present apparatus, depicting representative flow within such a vessel.

FIG. 4 shows a schematic front elevation cross-section view of an exemplary evaporator and condenser pair of the present apparatus.

FIG. 5 shows a schematic front elevation cross-section view of an exemplary three-effect distiller of the present apparatus.

FIG. 6 shows a schematic view of the use in the present apparatus of a streamline curvature in a vessel.

FIG. 7 presents two cross-sectional front perspective views of an aspect of an evaporator of the present apparatus.

FIG. 8 shows a cross-sectional schematic view of an aspect of the distillation apparatus of the present disclosure.

FIG. 9A presents a front elevation cross-section of an aspect of the present disclosure.

FIG. 9B presents a front perspective cross-section of an aspect of the present disclosure.

FIG. 9C presents a top elevation plan view of an aspect of the present disclosure.

FIG. 10 presents a photograph of a cross-section of an aspect of the present apparatus.

FIG. 11 presents a chart of temperature and heater power output over time, as described in the present disclosure.

FIG. 12 presents a photograph of a cross-section of an aspect of the present apparatus.

FIG. 13A presents a front elevation cross-section of an aspect of the present disclosure.

FIG. 13B presents a front perspective cross-section of an aspect of the present disclosure.

FIG. 13C presents a top elevation plan view of an aspect of the present disclosure.

FIG. 17 presents a photograph of a cross-section of an aspect of the present apparatus.

FIG. 18 presents modeled simulation results based on an aspect of the present disclosure.

FIG. 19 presents modeled simulation results based on an aspect of the present disclosure.

FIG. 20 presents modeled simulation results based on an aspect of the present disclosure.

DETAILED DESCRIPTION OF THE DRAWINGS

Figure 14:
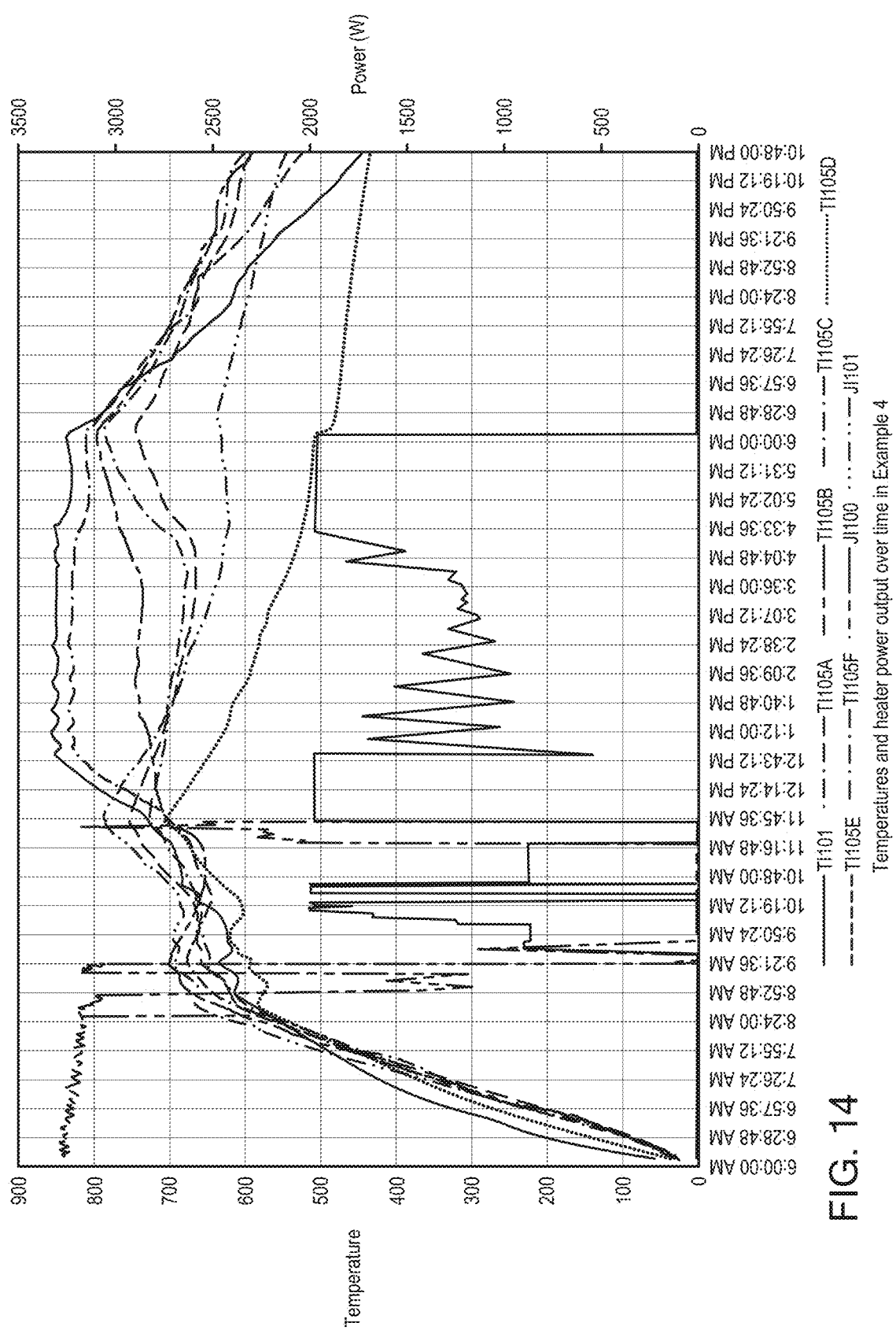
FIG. 14 presents a chart of temperature and heater power output over time, as described in the present disclosure.

The presently disclosed invention is described with specificity to meet statutory requirements. But, the description itself is not intended to limit the scope of this patent. Rather, the claimed invention might also be configured in other ways, to include different steps or elements similar to the ones described in this document, in conjunction with other present or future technologies. Moreover, although the term "step" or similar terms may be used herein to connote different aspects of methods employed, the term should not be interpreted as implying any particular order among or between various steps herein disclosed unless and except when the order of individual steps is explicitly described.

In the following description, numerous specific details are set forth to provide a thorough understanding of the invention. But, the present invention may be practiced without these specific details. Structures and techniques that would be known to one of ordinary skill in the art have not been shown in detail, in order not to obscure the invention. Referring to the figures, it is possible to see the various major elements constituting the apparatus and methods of use the present invention. The word "approximately" as used herein means within 5% of a stated value, and for ranges as given, applies to both the start and end of the range of values given.

FIG. 1A and FIG. 1B show a schematic of the magnesium distillation device. In some aspects, solid alloy with at least 40 mol % Mg is introduced into the top melter where it melts. Melted Mg alloy flows at a controlled rate downward into the top evaporator 110, where a portion of the Mg alloy evaporates. That portion which evaporates rises to the top condenser 120, where it condenses. The remaining magnesium which does not evaporate here flows down through the liquid flow tube 112 into the next evaporator 110, where a portion of it evaporates, and so on; each liquid flow tube 112 has an upper opening 114 and a lower opening 116. An evaporator 110-condenser 120 pair is called an effect 140, and at least one vapor flow tube 122 connects each condenser 120 to one of the plurality of evaporators 110. Each condenser 120 may be in thermal communication 124 with one of the plurality of evaporators 110 above the evaporator 110 in vapor flow connection 126 to that condenser 120. For purposes of the present disclosure, thermal communication 124 means that there is a threshold insulation "R value" (in units of $m^2$·degree/watt) with a minimum thermal resistance between a condenser 120 and adjacent evaporator 110 that is below a value of approximately 0.005 $m^2$·° C./W. In some aspects of the apparatus 100, a plate 125 dividing an evaporator 110 and a condenser 120 may be corrugated or otherwise shaped to increase or decrease the thermal communication 124 between the evaporator 110 and condenser 120. Heat flows upward from effect 140 to effect 140, from lower condensers to the evaporators 110 above them. Liquid magnesium flows downward between evaporators 110 from effect 140 to effect 140. Magnesium metal vapor 104 flows upward within each effect 140 from its evaporator 110 into its condenser 120 above it. Liquid flow tubes 112 control the height of liquid magnesium alloy in each evaporator 110. As described thus far, this is similar to the water distiller described in U.S. Pat. No. 5,094,721. The apparatus may further comprise a temperature-measuring-device 132 or a plurality of temperature-measuring-devices 132. The apparatus may further comprise a heater 150 or a plurality of heaters 150. In some aspects, the apparatus 100 may comprise a liquid concentrate vessel 142. In some aspects, the apparatus 100 may comprise an outer chamber 152 having an inside 154 and an outside 156, in which the plurality of evaporators 110 and the plurality of condensers 120 are enclosed in the outer chamber 152. In some aspects, the outer chamber 152 may further comprise a means of reducing pressure 158, including but not limited to being a vacuum chamber or including a vacuum pump, and in some aspects, the outer chamber 152 may further comprise a means of restricting heat flow 159, including but not limited to insulation or heat-conductive elements. In some aspects, the apparatus 100 may comprise a plurality of distillate tubes 128 connecting a plurality of condensers 120 inside the outer chamber 152 to a plurality of points 129 outside the outer chamber 152. In some aspects, the apparatus 100 may comprise a plurality of valves 160 connecting the uppermost evaporator 110 to the outside 156 of the outer chamber 152, wherein the plurality of valves 160 are configured to control flow of the liquid metal 102 into the uppermost evaporator 110. In some aspects, the apparatus 100 may comprise a multi-gated assembly 162 comprising at least one conduit 164 and at least two reversibly openable gates 166.

The apparatus 100 may further comprise a means 170 of controlling a rate of flow 171 down the liquid flow tube 112 between the uppermost evaporator 110 and the next evaporator 110 below the uppermost condenser 120. One or more of the vapor flow tubes 122 may further comprise at least one flow device 172 which increases a curvature 173 of the flow of the metal vapor 104. A plurality of the evaporators 110 may include a plurality of path complicators 174 for guiding a flow 171 of the liquid metal 102 and the metal vapor 104 in a manner which increases an effective length of the liquid metal and metal vapor flow path 175. A plurality of the condensers 120 may include a plurality of path complicators 176 for guiding flow 177 of the distillate 106 metal liquid and the metal vapor 104 in a manner which increases an effective length of a flow path of the liquid metal and the metal vapor 178, and the apparatus 100 may further comprise an exit vent tube 179, as shown in FIG. 4.

The apparatus 100 may further comprise a heat sink 180, which heat sink 180 is in thermal contact 181 with the uppermost evaporator 110. The heat sink 180 may contains a plurality of a liquid metal 102. The heat sink 180 may further comprises a melter 182.

The apparatus 100 may further comprise a top alloy-containing vessel 190.

There are several issues which limit the performance of this magnesium distiller, which this invention overcomes. First, in some applications the distiller is inherently unstable, in that a greater amount of flow of the liquid metal 102 downward from evaporator 110 to evaporator 110 leads to lower temperatures, reducing evaporation rate, and increasing liquid metal 102 flow rate further. Second, in some applications it is necessary to heat and melt the incoming magnesium alloy metal, which uses a considerable amount of energy. Third, in some applications the incoming magnesium alloy has 0.1-10 wt % zinc, or other volatile metals which have higher vapor pressure than magnesium, and concentrate in the distillate; in some applications it is helpful to separate these volatile metals to produce a purer magnesium product. Fourth, in some applications magnesium evaporation from alloy in the evaporator 110 can sometimes lead to aerosol creation and carry-over into the condenser 120, bringing low-volatility impurities to the condenser 120, and reducing distillate 106 purity.

In some aspects, this invention uses a control algorithm such as proportional integral derivative (PID) to increase and reduce the energy output from the main heater (FIG. 1A) in such a way as to maintain nearly constant temperature at the bottom of the bottom evaporator 110. This improves the stability of evaporation rates and flow rates throughout the distiller. In practice, controlling bottom evaporator 110 liquid metal 102 temperature within a 10° C. window maintains this stability.

In some aspects, this invention uses the top effect 140 condensation enthalpy as part of the energy required to heat and melt incoming magnesium, reducing the energy required by the distiller.

In some aspects, this invention uses a control algorithm such as PID to increase and reduce the flow rate of liquid metal 102 from the melter or top liquid metal holder 108 to the top evaporator 110 in such a way as to maintain nearly constant temperature in the top evaporator 110 liquid metal 102. Because the liquid metal 102 in the top melter or top liquid metal holder 108 is cooler than in the top evaporator 110, increasing this liquid metal 102 flow rate reduces the temperature of the top evaporator 110, and decreasing this liquid metal 102 flow rate leads over time to higher top evaporator 110 temperature. This too improves the stability of temperatures, evaporation rates and flow rates throughout the distiller. In practice, controlling top evaporator 110 liquid metal 102 temperature within a 10° C. window maintains this stability.

In some aspects, control of liquid metal 102 flow rate from the melter or top liquid metal holder 108 into the first evaporator 110 is established by a conical plug in the top liquid flow tube 112 which moves vertically to allow or restrict flow into that liquid flow tube 112: in the lowest position in closes off flow, and as it is raised the annulus between the liquid flow tube 112 and plug gradually opens, permitting some flow. In some aspects, control of liquid metal 102 flow rate from the melter or top liquid metal holder 108 into the first evaporator 110 is established by a tube approximately concentric with and overlapping the top liquid flow tube 112, either inside or outside of it, which moves vertically to allow or restrict flow into that liquid flow tube 112: in the lowest position, the top of tis tube is vertically aligned with the top of the liquid flow tube 112 and it does not restrict liquid metal 102 flow; as it rises, it increases the effective height of the liquid flow tube 112, reducing or stopping flow. This concentric tube device controls liquid metal 102 flow without restricting metal vapor 104 flow, such that the pressures in the top liquid metal holder 108 and upper liquid flow tube 112 remain the same.

In some aspects, this invention has a barrier which separates each evaporator 110 from the corresponding condenser 120 in the same effect 140 which prevents gas from flowing or diffusing back downward, such that metal vapor 104 only flows upward. FIG. 1A and FIG. 1B show this as a barrier separating each evaporator 110 from its corresponding condenser 120 above, with upward arrows depicting metal vapor 104 flow. If upward metal vapor 104 velocity is much greater than the quotient of diffusivity divided by passage length, i.e. Peclet number Pe is high $$Pe = \frac{VL}{D} \gg 1 \quad \text{(Equation 1)}$$

(V is average vapor velocity, L is the tube length, D is the interdiffusivity of metals) then the barrier minimizes downward diffusion of metal vapor 104 from the condenser 120. This enables the metal vapor 104 compositions to be different in the evaporator 110 and condenser 120, and enhances separation of more volatile metals, such as zinc in magnesium. That is, zinc or other volatile metal concentration in the top condenser 120 distillate 106 is higher than it would be without this barrier, leading to less zinc and higher purity in distillate 106 from the lower condensers.

A hard sphere model, see E. L. Cussler, *Diffusion: Mass Transfer in Fluid Systems* (2$^{nd}$ ed.). New York: Cambridge University Press (1997), estimates the Zn—Mg interdiffusivity as:

$$D_{Zn-Mg} \simeq \frac{A \cdot T^{3/2}}{P\sigma_{Zn-Mg}^2} \sqrt{\frac{1}{M_{Zn}} + \frac{1}{M_{Mg}}} \quad \text{(Equation 2)}$$

where A is an empirical constant equal to 0.00186, T is absolute temperature in K, P is pressure in atm, M is molar mass of a species in g/mol, and $\sigma_{12}$ is average radius of the two species in Å ($\sigma_{Zn}+\sigma_{Mg}$)÷2. To give an example, for Mg and Zn at 900° C. (1173 K) and 0.1 atm pressure, using 1.4 and 1.5 Å as atomic radii, diffusivity is approximately 85 cm²/s. A 1 kg/hour distillation effect creates Mg metal vapor 104 flow rate of 6.9 liters/second, so a 10 cm² cross section opening (3.6 cm diameter circular, larger than practical for illustrative purposes) has a velocity of 700 cm/s, and the criterion in equation 1 is satisfied for passages much longer than 85÷700=0.12 cm. That is, almost regardless of the passage length, there is negligible back-diffusion of zinc from the condenser 120 to the evaporator 110.

Some aspects employ a counter-flow evaporator 110 as shown in FIG. 2.

Here the evaporator 110 is designed such that plug flow conditions are achieved in the liquid and metal vapor 104 phases, and those two phases flow in opposite directions relative to each other. With evaporation at the liquid-vapor interface, plug flow results in very different compositions at dashed lines 1 and 2 in FIG. 2. For example, at dashed line 1, concentration of volatile zinc is higher in the liquid phase than at dashed line 2, and if liquid and metal vapor 104 are in equilibrium, then zinc concentration in the metal vapor 104 is also higher at dashed line 1 than at dashed line 2. This leads to higher zinc concentration in the metal vapor 104 than would be the case with mixed liquid and metal vapor 104 phases, enhancing zinc separation. For example, if the influent has 99 wt % Mg 1 wt % Zn, and the exiting metal vapor 104 is in equilibrium with influent liquid, then exiting metal vapor 104 has about 97.2 wt % Mg 2.8 wt % Zn.

Plug flow conditions are enhanced by reducing longitudinal mixing and enhancing lateral mixing and length, i.e. high effective Peclet number in the longitudinal direction and low Peclet number in the lateral direction. In some aspects, adding flow vanes to the evaporator 110 as shown in FIG. 3 creates a long and tortuous flow path, increasing both average velocity and channel length, and thus enhancing plug flow.

Some aspects include a vented counter-flow condenser 120 as shown in FIG. 4. (Counter-flow condensers 120 are commonplace where the metal vapor 104 is separated from a cooling liquid by a non-porous barrier; in this case, the metal vapor 104 and condensed distillate 106 liquid flow in opposite direction in the condenser 120 vessel itself.) Similar to the counter-flow evaporator 110, this is accomplished by promoting plug flow conditions in the liquid and metal vapor 104 phases of the condenser 120. A vent allows some metal vapor 104 to exit from the condenser 120 to a separate condensing chamber. That exiting metal vapor 104 is very rich in volatile metals, such as zinc, such that magnesium in the condenser 120 is purer than without the vent and counter-flow condition. This is similar to an ammonia-water separation device in the patent literature, see U.S. Pat. No. 10,011,502, to Zebuhr, "Ammonia Removal Device", granted Jul. 3, 2018.

As with the counter-flow evaporator 110, vanes such as those shown in FIG. 3 can increase the Peclet number and enhance plug flow. FIG. 4 shows an evaporator 110-condenser 120 wall at a ~25° angle off horizontal, but any angle from 0.1° to 90° (vertical), or even past vertical, can create a liquid film with flow in the opposite direction from the vapor. Or with a mostly horizontal evaporator 110-condenser 120 wall (angle <2° from horizontal), a sloped floor of the liquid-vapor flow channel 130, also shown in FIG. 4, can make the liquid flow in the opposite direction from the vapor.

In the limit of perfect mass transfer and a long condenser 120, distillate 106 concentration approaches that of its lower evaporator 110 influent liquid. But concentration of volatile elements such as zinc falls before concentration of non-volatiles such as aluminum rises, so assuming negligible aerosol carry-over into the condenser 120, non-volatile metals should not enter the condenser 120 while this effectively separates volatile metals.

In some aspects, liquid magnesium distillate 106 is stored in the condensers 120, as shown schematically in FIG. 4 and FIG. 5. Distillate 106 is tapped out when the condensers 120 are full, for example by heating frozen metal plugs in the exit lines, or using other means of opening flow to the outside. This can simplify distiller design, and permit separate storage of multiple grades of distilled magnesium with different concentrations of various alloying elements, particularly relatively volatile elements such as zinc.

In some aspects, the exemplary apparatus 100, also referred to herein as a G-METS, is inside a vacuum chamber. This reduces hoop stresses in the walls when internal pressure is below about 50 MPa (0.5 atm), as is the case for most practical magnesium distillers of this kind. The vacuum can also reduce heat losses from the sides of the apparatus 100.

In some aspects, tap lines from multiple condensers 120 are connected such that multiple distillate 106 streams blend together. This reduces the number of distillate 106 taps.

Some aspects include one or more devices to create high velocity and streamline curvature in magnesium metal vapor 104 lines from evaporator 110 to condenser 120. Running the magnesium alloy evaporator 110 at high rate per unit area can produce an aerosol of magnesium alloy liquid particles in magnesium vapor. Flow curvature devices are well known for separating liquid and solid particles from gas streams. FIG. 6 illustrates this principle in general, and FIG. 7 shows an aspect of this concept called herein a "baffle". Cyclone separators and similar devices which promote high metal vapor 104 velocity and streamline curvature are other examples of this aspect.

One can estimate dilute gas viscosity using Chapman-Enskog hard sphere theory:

$$\mu = 1.016 \cdot \frac{5}{16\sigma^2} \sqrt{\frac{mkT}{\pi}} \quad \text{(Equation 3)}$$

where $\sigma$ is the atomic cross section, m the molecular mass, k Boltzmann's constant and T absolute temperature. See J. H. Hildebrand, "Viscosity of dilute gases and vapors," Proc. Nat. Acad. Sci. 73(12):4302, 1976. At 900° C. (1173 K) using 0.14 nm for Mg collision radius gives magnesium metal vapor 104 viscosity as about $2.3 \times 10^{-4}$ Pa·s. Cyclone separator theory gives the cut-point diameter $d_p$ as:

$$d_p = \sqrt{\frac{9\mu W}{\pi N V (\rho_1 - \rho_2)}} \quad \text{(Equation 4)}$$

where W is entrance width, N number of "turns", V transverse velocity, and $\rho_1$ and $\rho_2$ are particle and gas densities. See M. Taiwo et al., "Design and analysis of cyclone dust separator," Amer. J. Engin. Res. 5(4):130. For the 1 kg/hour effect mentioned above, with two inlet triangles each with area half of 2.5×1.25 cm, gas velocity is 2240 cm/s. The baffle can be said to have two quarter-turns, so N=0.5. With 1500 kg/m$^3$ liquid magnesium density, cut-point diameter is thus about 65 μm. Because the baffle is partially effective, the magnesium alloy aerosol likely has particle size comparable to this $d_p$ value.

A cyclone separator in the evaporator 110, with the bottom partially immersed in the liquid alloy, would have far more turns N and potentially higher velocity V, reducing cut point diameter by a factor of about 3-6. This would likely remove a larger fraction of magnesium alloy aerosol droplets, and improve separation of low-volatility elements. With the parameters above, pressure drop between the outside and inside of the cyclone would be about 2 Pa, resulting in about 0.13 mm higher liquid surface inside the cyclone. At the same pressure, increasing velocity 5× would lead to 50 Pa pressure drop and 3 cm higher liquid surface.

It will be apparent to one of skill in the art that various baffle dimensions are possible, with different levels of efficiency and different particle size distributions. Baffles or cyclones with dimensions which fit well into an exemplary evaporator 110 will serve to separate much of the magnesium alloy liquid aerosol from the metal vapor 104 stream.

Because it is difficult to know to what extent condensers 120 or concentrate accumulator are filled with liquid distillate 106 at a given time, in some aspects, two or more electrical leads are connected to two points of contact on the sides of a condenser or the concentrate accumulator in order to measure the electrical resistance between those two points of contact. Due to the electrical conductivity of a liquid metal 102, a full vessel has lower electrical resistance than an empty one, and resistance correlates with fill level.

This invention combines the distiller described above with a molten salt electrolysis cell for reducing a first metal oxide, illustratively magnesium oxide. The electrolysis cell employs a reactive cathode comprising a dense liquid metal 103 such as tin, indium, lead or bismuth, into which magnesium is electrowon. See U.S. Pat. No. 2,431,723, to Yerkes, "Electrolytic Method for Producing Magnesium Alloys", Dec. 2, 1947. This increases the density of the liquid metal 102 alloy product, such that it remains on the bottom of the cell, even though the molten salt is denser than liquid magnesium. In addition, this reduces the activity of magnesium metal in the cell, such that its activity, and equilibrium concentration in a molten fluoride salt bath, are lower than for pure magnesium.

FIG. 8 shows a schematic of the reduction cell with two anode options. Either or both of the carbon or solid electrolyte-encased anode can be used. "Infinium Anode" here refers to a stabilized zirconia solid electrolyte between the molten salt and anode, which can produce high-purity oxygen as a by-product. See U.S. Pat. No. 5,976,345 to Pal and Britten, "Method and apparatus for metal extraction and sensor device related thereto", issued Nov. 2, 1999, and U.S. Pat. No. 6,299,742 to Pal and Britten, "Apparatus for metal extraction", issued Oct. 9, 2001, which describe the use of type of anode with solid electrolyte. It is shown here as a set of closed-end zirconia tubes immersed in the bath.

In an example of operation, a dense liquid metal 103, illustratively tin, with 1-50 wt % Mg, or illustratively 10 wt % Mg (35 mol % Mg), is charged to the electrolysis cell, where it sinks to the bottom. DC potential is applied to reduce MgO in the bath to Mg in the reactive alloy cathode and $O_2$ or $CO/CO_2$ at the anode. While potential is applied, MgO is periodically or continuously fed to the molten salt bath where it dissolves. When Mg concentration in the liquid alloy cathode reaches 10-90 wt %, or illustratively 50 wt % in Sn (83 mol % Mg), then a siphon removes 5%-95% of the alloy cathode (referred to here as "high-Mg alloy product"), or illustratively 90% of the alloy cathode. Then new low-Mg liquid (dense liquid metal 103 illustratively tin with 1-50 wt % Mg) is fed into the cell, and the process repeats. High-Mg alloy product is introduced to the distiller described above, where most of the Mg is separated out as the final product, and the dense liquid metal 103 is returned to the electrolysis cell.

The bath comprises the fluoride of the first metal, illustratively magnesium fluoride and optionally calcium fluoride, strontium fluoride, barium fluoride, lithium fluoride, sodium fluoride, and/or potassium fluoride. The first metal fluoride provides high first metal cation density, minimizing mass transfer resistance at the cathode interface. Other Group II fluorides ($MgF_2$, $CaF_2$, $SrF_2$, $BaF_2$, LiF, NaF, KF) reduce the bath liquidus point, and Group I fluorides (LiF, NaF, KF) reduce bath density as well as liquidus temperature.

Tin is a particularly advantageous liquid second metal cathode for several reasons. Solubility of iron is low, so the cathode alloy can potentially be contained in a steel vessel. The $Mg_2Sn$ intermetallic compound dissolves at 770° C., which is below a reasonable influent temperature for a G-METS distiller. At 770° C., dilution to 10 wt % Mg, (35 mol % Mg) reduces Mg activity to 0.015; increasing to 50 wt % Mg (83 mol % Mg) brings Mg activity to about 0.75. Tin is also a beneficial alloying element for magnesium, and most Mg alloys can tolerate significant tin.

$SiO_2$ is a significant impurity in some MgO raw material, and silicon solubility in tin is strongly temperature-dependent. For example, if raw material is MgO with 5 wt % $SiO_2$, then alloy coming from the electrolysis cell with 50 wt % Mg could be as high as 2 wt % Si. After distillation, the concentrate would contain about 10 wt % Mg (35 mol %) and 3.3 wt % Si (9.3 mol % Si), which is likely liquid at 950°, a typical bottom effect 140 evaporator 110 temperature. But silicon solubility in liquid tin falls rapidly with decreasing temperature, such that cooling to about 600° C. creates floating solid silicon or $Mg_2Si$ particles which can be skimmed or filtered, with very little silicon in the liquid alloy returned to the cell.

Calcium oxide (CaO) is another significant impurity in MgO raw material. This will likely remain in the bath, and $MgF_2$ can be fed accordingly to effect the reaction in the molten salt: $CaO+MgF_2 \rightarrow CaF_2+MgO$. $CaF_2$ accumulates in the bath (diluted by additional $MgF_2$), while MgO effectively joins the raw material, being made into Mg dissolved in the cathode and $O_2$ or $CO/CO_2$ at the anode.

Electrolysis cell design is similar in configuration to a Hall-Héroult cell for aluminum production, and can be retrofitted into an existing aluminum plant. This would re-use the electrical connections to each cell, oxide raw material distribution system, and likely the siphon devices used to remove product high-Mg alloy product from each cell. With certain refractories, illustratively refractories comprising zirconium oxide, the cell does not need a frozen bath side wall, and can use thermal insulation to dramatically reduce energy losses. At a given current and current efficiency, a cell of this type produces 50% more magnesium than a Hall-Héroult cell produces aluminum by mole, which is 33% more Mg by mass.

The examples below describe five experiments and two simulations with one-effect 140 and two-effect 140 batch distillers using pure Mg and a synthetic scrap alloy. All examples use 5.76" (14.63 cm) inner diameter pipe with 168 $cm^2$ evaporator 110 liquid surface area. Energy consumption is 1-2 kWh/kg for distillation at or above 0.8 kg/hour i.e. 4.8 g/$cm^2$·hr (examples 1, 2, 5 bottom effect), and above 4 kWh/kg at 0.3 kg/hour i.e. 1.8 g/cm²·hr (example 4) Lower distillation rate correlates with better purification, complete distillation correlates with poorer purification, and use of a baffle streamline curvature device (FIG. 7) improves purification further. In particular:

Examples 2 and the bottom effect 140 of Example 5 ran to completion at 6.0 and 5.1 g/cm²·hr respectively and achieved poor separation (20-50% impurities removal)

Example 4 bottom effect 140 and Example 5 top effect 140 ran at 1.8 and 1.5 g/cm²·hr respectively, though neither to completion, and achieved very good separation (85-88% and 95-99% removal)

Example 3 ran to completion at 1.8 g/cm²·hr with a vapor flow baffle and achieved excellent separation (95-99.5% removal).

In all of the above examples, zinc concentrated in the distillate, i.e., zinc concentration in distillate 106 was higher than in the influent. This will generally be true for a given effect 140, as zinc vapor pressure is higher than that of magnesium at a given temperature. But in a multiple-effect 140 distiller, much of the zinc can exit the liquid stream in the first one or two condensers 120, leading to purer distillate 106 in the lower condenser 120, and effective separation of the volatile metal (zinc) from the base metal (magnesium).

Examples 6-8 are simulations illustrating the effects of counter-flow evaporators 110 and counter-flow vented condensers 120 on volatile metal separation. These devices dramatically improve zinc separation, with most of the distillate 106 product having less than 0.2 wt % zinc, making it suitable for nearly all non-zinc magnesium alloys: AM (Mg—Al—Mn), AE (Mg-Al-rare earth), AT (Mg—Al—Sn), WE (Mg-Y-rare earth) alloys allow 0.2 wt % zinc.

Example 1. In a single effect 140 batch distiller, 3.0 kg of commercially pure magnesium distilled from the evaporator 110 to the condenser 120 at 1.3 kg/hour. FIG. 9A, FIG. 9B, and FIG. 9C show drawings of an exemplary apparatus 100. The bottom surface of the evaporator 110 was held at 900° C. and the top surface at 775° C. After about 2.25 hours, bottom heater power to maintain bottom evaporator 110 temperature dropped dramatically, indicating complete distillation. During the 2.25 hours of distillation, the bottom heater used about 3.5 kWh of energy, i.e. about 1.2 kWh/kg of magnesium distilled.

Example 2. In a single-effect 140 batch distiller similar to that in Example 1, 3.26 kg of synthetic scrap was loaded. This scrap consisted of AZ31 alloy (nominally 3% aluminum 1% zinc) with added copper, nickel and iron. The synthetic scrap composition was: 2.3 wt % Al 0.7% Zn 0.4% Mn 3.9% Fe 1.0% Cu 1.0% Ni balance Mg. The apparatus 100 was heated to 700° C. using bottom and side heaters, then the side heaters were turned off and the bottom heater set point increased to 900°, which was reached in less than an hour. About an hour after reaching this bottom temperature set point, that set point was increased to 950°. At that point, temperature data seem to indicate that distillation rate increased significantly, as the bottom temperature fell and top temperature rose dramatically. Somewhat over an hour later, the bottom temperature rose rapidly and top temperature fell, indicating distillation was complete.

Total distillation time was about 3.25 hours, indicating 1.0 kg/hour distillation. During that time, the distiller used 5.9 kWh energy, i.e. 1.8 kWh/kg magnesium product. Examination of the distiller (FIG. 10) showed 100% distillation, with distillate 106 composition 1.36 wt % Al 0.85% Zn 0.29% Mn 0.01% Fe 0.65% Cu 0.25% Ni. This indicated 41% reduction in Al, 27% reduction in Mn, 35% reduction in Cu and 75% reduction in Ni content in distillate 106 vs. the charge.

Example 3. In a single-effect 140 batch distiller similar to that in Example 1, but with a baffle shown in FIG. 7, 1 kg of the same synthetic scrap as Example 2 was loaded. Distillation ran for about 3 hours, at about 0.3 kg/hour on average, but with furnace power increased as shown in FIG. 11 so the rate changed over time. At the end, bottom temperature increased and top temperature decreased, indicating complete distillation. Examination shown in FIG. 12 confirmed complete distillation, with distillate 106 composition 0.01 wt % Al 0.72% Zn 0.01% Mn 0.05% Cu 0.01% Ni. This indicates >99% reduction in Al and Ni, with 95% reduction in Mn and Cu, and slight enrichment in Zn in distillate 106 vs. the charge.

At the 730-770° C. magnesium metal vapor 104 temperature, metal vapor 104 pressure is 2000-3000 Pa, and density is 0.24-0.35 mol/m³, i.e. 5.8-8.5 g/m³. 0.3 kg/hour distillation rate translates to 9900-14,300 cm³/s flow rate. With two 2.5×1.25 cm inlet triangles, magnesium metal vapor 104 velocity is 3200-4600 cm/s, and the "cyclone" cut point diameter is Example 4. In a two-effect 140 batch distiller, 6.6 kg of the same synthetic scrap as Example 2 was loaded, with 4.0 kg in the lower effect 140 and 2.6 kg in the upper effect 140. FIG. 13A, FIG. 13B, and FIG. 13C show drawings of an exemplary apparatus 100. The lower effect 140 evaporator 110 was made of 310 stainless steel, the remainder of 1018 steel. The bottom temperature was held at 850° and the top temperature not controlled, resulting in decline in the top temperature over time, as shown in FIG. 14. Declining top temperature resulted in a frozen plug in the top effect 140, as shown in FIG. 15, preventing metal vapor 104 transport.

Figure 15:
FIG. 15 presents a photograph of a cross-section of an aspect of the present apparatus.

After 6 hours, distillation stopped with about 1.7 kg magnesium alloy distilled in the bottom effect 140 (just under 0.3 kg/hour, about 25% of the rate in Example 1), and very little in the top effect 140, as shown in FIG. 15. Distillate 106 in the bottom effect 140 had 0.32 wt % Al 1.7% Zn 0.05% Mn 0.03% Fe 0.13% Cu 0.12% Ni, indicating 85-89% reduction in Al, Mn, Cu and Ni content in distillate 106 vs. the charge.

Figure 16:
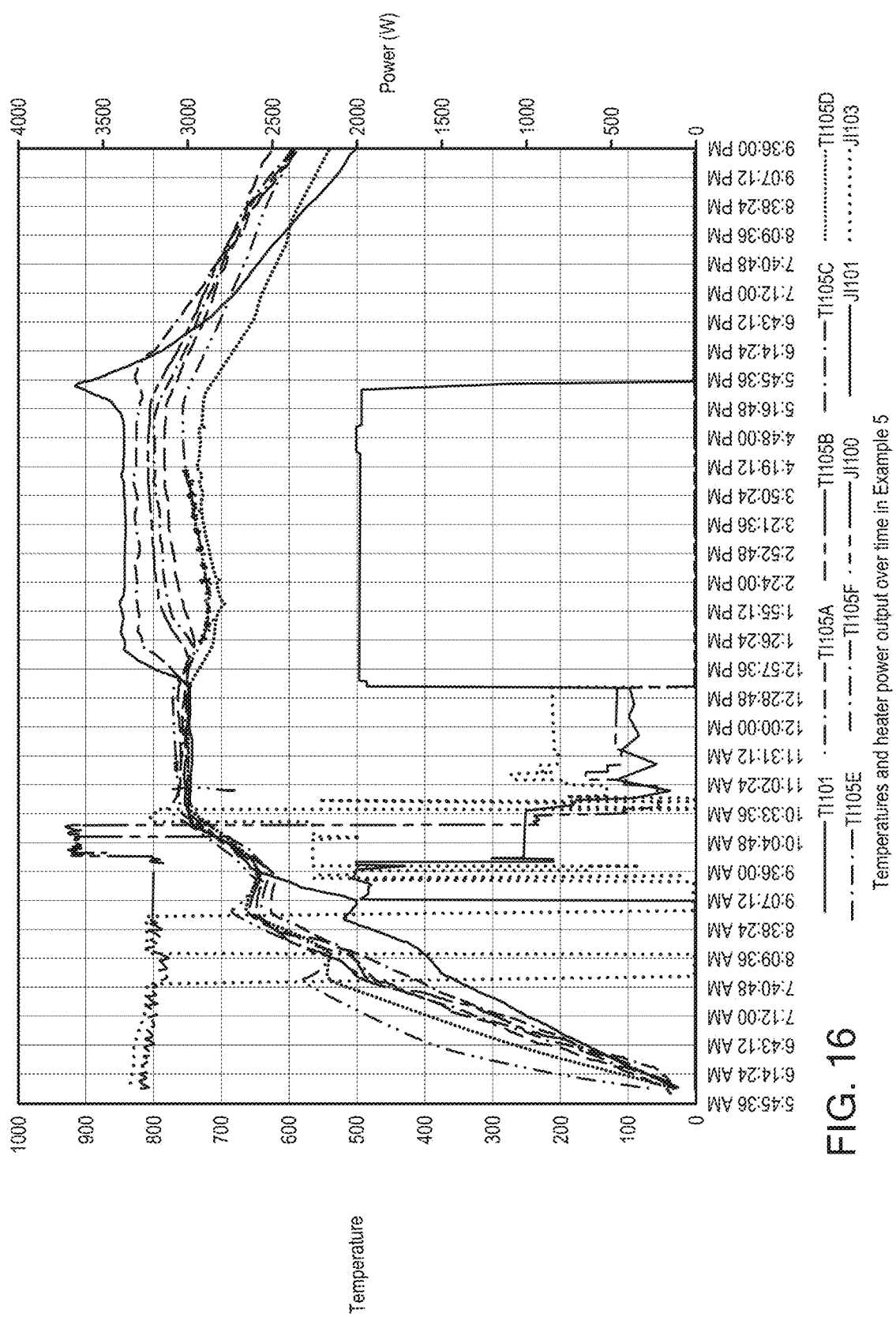
FIG. 16 presents a chart of temperature and heater power output over time, as described in the present disclosure.

Example 5. In a two-effect 140 batch distiller similar to that of Example 3 (drawings shown in FIG. 13A, FIG. 13B, and FIG. 13C), the same synthetic scrap composition was placed in both evaporators 110, but this time with 4.3 kg in the bottom effect 140 and 2.6 kg in the top effect 140. This time the whole distiller was held at 750° C.±15° for two hours using side heaters in order to melt all of the magnesium before starting distillation. A small heater kept the top surface of the top effect 140 at 750° during this time to prevent freezing of a plug as happened in Example 2. After this, side and top heaters were shut off and the bottom temperature set point raised to 900°, though bottom heater power was limited to 2000 W. Metal evaporation in the evaporators 110 and condensation in the condensers 120 kept the bottom temperature at about 840°, below its set point due to the 2000 W power limitation, and the top temperature above 700°. Temperatures and heater power output records vs. time are shown in FIG. 16.

After 5 hours of distillation, the bottom temperature rose rapidly indicating complete evaporation of magnesium from the bottom effect 140 at 0.86 kg/hour. Examination of the apparatus 100, shown in FIG. 17, confirmed complete evaporation from the bottom effect 140, and about half of the top effect 140 as well, about 1.3 kg, at about 0.26 kg/hour. This indicates that about 30% of the condensation energy from the bottom effect 140 resulted in top effect 140 evaporation. Bottom heater power was 2000 W, so energy consumption was about 1.8 kWh/kg Mg.

Distillate 106 in the bottom effect 140 had 0.99 wt % Al 0.98% Zn 0.23% Mn 0.05% Fe 0.78% Cu 0.32% Ni, indicating 57% reduction in Al, 43% reduction in Mn, 22% reduction in Cu, and 68% reduction in Ni. Distillate 106 in the top effect 140 had 0.02 wt % Al (99% reduction), 1.11% Zn, 0.01% Mn (97% reduction), 0.06% Fe, 0.05% Cu (95% reduction), and 0.01% Ni (99% reduction).

Example 6. FIG. 18 shows output of a simulation of a six-effect 140 magnesium distiller assuming perfectly mixed evaporators 110 and condensers 120. The influent scrap is 5 wt % Al 1% Zn balance Mg. It assumes negligible aerosol carry-over, i.e. nearly zero aluminum in distillate 106 streams, and different evaporator 110 and condenser 120 metal vapor 104 compositions, i.e. presence of an effective barrier preventing metal vapor 104 back-diffusion from condenser 120 to evaporator 110. Bottom evaporator 110 temperature is 950° C., and top condenser 120 outside temperature and top evaporator 110 influent magnesium are both at 800° C.

Zinc separation in this distiller is relatively poor: the bottom effect 140 distillate 106 D1 has 0.28 wt % Zn. Combining the bottom four effect 140 distillates gives 0.9 wt % Zn product, which is suitable for use in 1 wt % Zn alloys such as AZ91, AZ31, ZEK100 etc. The top two effect 140 distillates D5 and D6 average 2.1 wt % Zn, which is suitable for high-zinc alloys such as ZE41 or potentially ZE20, or for a Mg—Zn master alloy.

Example 7. FIG. 19 shows output of a simulation of a six-effect 140 magnesium distiller assuming counter-flow evaporators 110 and condensers 120. The influent scrap is 5 wt % Al 1% Zn balance Mg. It assumes negligible aerosol carry-over, i.e. little aluminum in distillate 106 streams, and different evaporator 110 and condenser 120 metal vapor 104 compositions, i.e. little metal vapor 104 back-diffusion from condenser 120 to evaporator 110. Bottom evaporator 110 temperature is 950° C., and top condenser 120 outside temperature and top evaporator 110 influent magnesium are both at 800° C.

Zinc separation here is quite good: bottom effect 140 distillate 106 D1 has just 0.01 wt % Zn, and blended distillate 106 from the bottom five effects, with over 83% of the influent metal by mass, has just 0.18 wt % Zn. This is suitable for nearly any magnesium alloy as described above. The top effect 140 distillate 106 D6 has 0.78 wt % Zn, which is suitable for use in 1 wt % Zn alloys. Vented metal vapor 104 from condensers 120 produces a distillate 106 with 50 wt % Zn and 0.16% of the influent mass.

Example 8. FIG. 20 shows output of a simulation of a three-effect 140 magnesium distiller assuming counter-flow evaporators 110 and condensers 120. The influent scrap is 5 wt % Al 1% Zn balance Mg. It assumes negligible aerosol carry-over, i.e. nearly zero aluminum in distillate 106 streams, and different evaporator 110 and condenser 120 metal vapor 104 compositions, i.e. presence of an effective barrier preventing metal vapor 104 back-diffusion from condenser 120 to evaporator 110. Bottom evaporator 110 temperature is 950° C., and top condenser 120 outside temperature and top evaporator 110 influent magnesium are both at 800° C.

Zinc separation is again quite good: blended distillate 106 from the bottom two condensers 120 D1+D2 is just 0.03 wt % Zn, suitable for any Mg alloy. The top condenser 120 distillate 106 is 0.7 wt % Zn, suitable for use in 1 wt % Zn alloys. Vented metal vapor 104 from condensers 120 produces a distillate 106 with 50 wt % Zn and 1% of the influent mass.

Certain aspects of the present invention were described above. From the foregoing it will be seen that this invention is one well adapted to attain all the ends and objects set forth above, together with other advantages, which are clear in and inherent to the apparatus 100 disclosed herein. It will be understood that certain features and sub-combinations are of utility and may be employed without reference to other features and sub-combinations. It is expressly noted that the present invention is not limited to those aspects described above, but rather the intention is that additions and modifications to what was expressly described herein are also included within the scope of the invention. Moreover, it is to be understood that the features of the various aspects described herein are not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

Accordingly, what is claimed is:

1. An apparatus for distilling a liquid metal, the apparatus comprising:
    a plurality of two or more evaporators, for containing a liquid metal and a metal vapor in each of the evaporators; and
    a plurality of two or more condensers, for containing a distillate metal liquid and metal vapor in each of the condensers, arranged in succession vertically, comprising:
        a lowest evaporator and an uppermost evaporator; and
            at least one liquid flow tube connecting each evaporator to the evaporator that is next below it,
        where the evaporators are referred to as an upper evaporator and a lower evaporator with regard to each liquid flow tube; and
        where each such liquid flow tube has:
            an upper opening in the upper evaporator with regard to that liquid flow tube; and
            and a lower opening in the lower evaporator with regard to that liquid flow tube; and
        where a first evaporator is both below a second evaporator, if present, and connected to the second evaporator with a first liquid flow tube, and where the first evaporator is above a third evaporator, if present, and connected to the third evaporator with a second liquid flow tube,
            the lower opening of that first liquid flow tube in the first evaporator is below the upper opening of the second liquid flow tube in the first evaporator;
            and wherein at least one vapor flow tube connects each condenser to one of the plurality of evaporators below that condenser; and
            with each condenser in thermal communication with one of the plurality of evaporators above the evaporator in vapor flow connection to that condenser; and
            wherein a heater is configured to provide heat to the lowest evaporator of the plurality of evaporators.

2. The apparatus of claim 1, in which the lowest evaporator further comprises a temperature-measuring-device.

3. The apparatus of claim 1, in which the uppermost evaporator further comprises a temperature-measuring-device.

4. The apparatus of claim 1, in which a liquid concentrate vessel is below and connected to the lowest evaporator, which lowest evaporator is connected to a condenser.

5. The apparatus of claim 1, further comprising an outer chamber having an inside and an outside, in which the plurality of evaporators and the plurality of condensers are enclosed in the outer chamber.

6. The apparatus of claim 5, in which the outer chamber comprises a means of reducing pressure below 0.5 atm.

7. The apparatus of claim 5, in which the outer chamber comprises a means of restricting heat flow.

8. The apparatus of claim 5, further comprising a plurality of distillate tubes connecting a plurality of condensers inside the outer chamber to a plurality of points outside the outer chamber.

9. The apparatus of claim 8, further comprising a heater outside of the outer chamber, in which at least one of the distillate tubes connecting from a condenser to at least one point outside the outer chamber is configured with the heater, which heater is configured to provide heat to the distillate tube.

10. The apparatus of claim 5, further comprising a plurality of valves connecting the uppermost evaporator to the outside of the outer chamber, wherein the plurality of valves are configured to control flow of the liquid metal into the uppermost evaporator.

11. The apparatus of claim 5, further comprising a multi-gated assembly comprising at least one conduit and at least two reversibly openable gates for blocking the conduit, which multi-gated assembly enables periodic flow of liquid or solid metal from outside the outer chamber to the uppermost evaporator, and wherein at least one of the gates is closed at all times.

12. The apparatus of claim 1, further comprising a means of controlling a rate of flow down the liquid flow tube between the uppermost evaporator and the next evaporator below the uppermost condenser.

13. The apparatus of claim 1, in which one or more of the vapor flow tubes further comprises at least one flow device which increases a curvature of the flow of the metal vapor.

14. The apparatus of claim 1, in which a plurality of the evaporators include a plurality of path complicators for guiding a flow of the liquid metal and the metal vapor in a manner which increases an effective length of atho liquid metal flow path and a metal vapor flow path.

15. The apparatus of claim 1, in which a plurality of the condensers include a plurality of plates for guiding flow of the distillate metal liquid and the metal vapor in a manner which increases an effective length of a flow path of the liquid metal and the metal vapor, and the apparatus further comprises an exit vent tube.

16. The apparatus of claim 1, in which a heat sink is in thermal contact with the uppermost evaporator.

17. The apparatus of claim 16, in which the heat sink contains a plurality of a liquid metal.

18. the apparatus of claim 16, in which the heat sink further comprises a melter.

19. A method of distilling a metal using a plurality of vessels, comprising:
   introducing a metal alloy into a top alloy-containing vessel;
   causing the metal alloy to flow down a first liquid flow tube into an uppermost evaporator of at least two evaporators, with at least:
   an uppermost evaporator; and
   at least a lowest evaporator, then caused to flow down a second liquid flow tube into a second evaporator, and
   wherein from the uppermost evaporator one or more metals evaporates into a metal vapor and flows into a first condenser where the metal vapor condenses and is stored as a liquid metal distillate having a temperature; and
   wherein from the second evaporator one or more metals preferentially evaporates into a metal vapor and flows into a second condenser where the metal vapor condenses and is stored as a liquid metal distillate having a temperature,
   and where as each metal vapor condenses in a condenser,
      the metal vapor transfers heat into the evaporator adjacent to the condenser, with heat primarily being transferred to the uppermost of the evaporators and cascading upward from each condenser to evaporator to provide heat for vaporization for all of the evaporators.

20. The method of claim 19, in which the liquid metal distillate has a temperature of at least 400° C.

21. The method of claim 19, in which the metal alloy introduced is at least 50 mol % magnesium.

22. The method of claim 19, in which the metal alloy introduced is at least 50 mol % a metal selected from a list comprising zinc, cadmium, tellurium, thallium, or bismuth.

23. The method of claim 19, in which the metal alloy introduced is at least 50 mol % a metal selected from a list comprising lithium, sodium, potassium, calcium, strontium, or barium.

24. The method of claim 19, in which the metal alloy introduced is at least 50 mol % a metal selected from a list comprising samarium, europium, or ytterbium.

25. The method of claim 19, in which a heater is configured to provide heat to the lowest evaporator, and the heat supplied by the heater is controlled to maintain a temperature within ±20° C. of a temperature setpoint in the lowest evaporator.

26. The method of claim 19, in which the lowest evaporator is connected to an alloy concentrate storage vessel by a concentrate liquid flow tube.

27. The method of claim 19, in which a rate of flow of liquid metal alloy from the top alloy-containing vessel through one or more top liquid flow tubes to the first evaporator is controlled by a valve or tube concentric with each top liquid flow tube, with a temperature-measuring-device in the first evaporator, to maintain a desired first evaporator temperature setpoint.

28. The method of claim 19, in which a chamber enclosing the evaporators and condensers, and a pump connected to the chamber maintain a pressure inside the chamber below 0.2 atm.

29. The method of claim 28, in which the chamber enclosing the evaporators and condensers uses a plurality of insulating materials to reduce heat flow from the evaporators and condensers to outside the chamber.

30. The method of claim 19, further comprising introducing solid metal into the uppermost evaporator through a multi-gated assembly.

31. The method of claim 19, in which the liquid metal distillate is removed from one or more condensers through one or more distillate tubes configured with at least one heater on a cold section of one or more distillate tubes, such that turning on the at least one heater melts frozen metal in the one or more distillate tubes and allows the liquid metal distillate to flow out of the one or more condensers.

32. The method of claim 26, in which liquid metal alloy concentrate is removed from the alloy concentrate storage vessel through one or more concentrate tubes configured with at least one heater on a cold section of the concentrate tubes,
such that turning on the at least one heater melts frozen metal in the concentrate tubes and allows liquid metal alloy concentrate to flow out of the alloy concentrate storage vessel.

33. The method of claim 19, in which the metal vapor from at least one evaporator to at least one condenser is made to flow through a high-curvature device at a velocity sufficient that small entrained liquid metal alloy droplets are separated from the metal vapor.

34. The method of claim 19, in which one or more evaporators comprise a tortuous flow path to increase an effective flow path length in the evaporator of the liquid metal alloy and of the metal vapor.

35. The method of claim 19, in which one or more condensers comprise a tortuous flow path to increase an effective flow path length in the condenser of the distillate metal liquid and of the metal vapor.

36. The method of claim 19, in which a level of the liquid metal in one or more of the plurality of vessels is estimated by measuring an electrical resistance between at least two points on one of the plurality of vessels.

37. The method of claim 26, in which a level of the liquid metal in one or more of the plurality of vessels is estimated by measuring an electrical resistance between at least two points on one of the plurality of vessels.

38. A process for producing a first metal by electrolysis of an oxide of the first metal in an electrolysis cell, comprising:
a liquid mixture of halide salts and oxides, by applying a direct current potential between at least one anode and at least one cathode; and,
adding the oxide of the first metal to the liquid mixture of halide salts, with a dense liquid including a second metal at least one cathode such that an alloy forms at the cathode comprising the first and second metals at the cathode;
removing the alloy including the first and second metals from the electrolysis cell; and,
using distillation to remove a portion of the first metal from the alloy including the first and second metals, where the distillation evaporates a portion of the first metal and uses a heat released in condensation of the first metal to provide at least 30% of the heat required for evaporation of the first metal.

39. The process of claim 38 in which a plurality of the alloy including the first and second metals is returned to the electrolysis cell cathode.

40. The process of claim 38 in which a plurality of impurity metals are removed from the alloy including the first and second metals, by:
introducing the alloy into a separation vessel, reducing a temperature of the alloy by at least 50° C.; and,
maintaining the alloy in the vessel for a period of time in which a plurality of the impurity metals separate from the alloy as a plurality of impurity metal solids, then removing the alloy, from which the plurality of the impurity metal solids separated, from the separation vessel.

41. The process of claim 40 in which the separation vessel is rotated in order to enhance a rate of solid impurity metal separation.

42. The process of claim 38 in which some impurity metals are removed from the alloy including the first and second metals by reducing its temperature by at least 50° C. and using a filter or sieve to remove a plurality of impurity metal solids.

43. The process of claim 38 in which the second metal is selected from a list comprising copper, gallium, germanium, silver, indium, tin, antimony, thallium, lead, or bismuth.

44. The process of claim 38 in which the second metal is selected from a list comprising indium, tin, antimony, lead, or bismuth.

45. The process of claim 38 in which the first metal is selected from a list comprising lithium, sodium, potassium, magnesium, calcium, strontium, or barium.

46. The process of claim 38 in which the first metal is selected from a list comprising zinc, cadmium, tellurium, thallium, or bismuth.

47. The process of claim 38 in which the first metal is selected from a list comprising samarium, europium, or ytterbium.

* * * * *

UNITED STATES PATENT AND TRADEMARK OFFICE
CERTIFICATE OF CORRECTION

| | | |
|---|---|---|
| PATENT NO. | : 11,773,500 B2 | Page 1 of 1 |
| APPLICATION NO. | : 16/944147 | |
| DATED | : October 3, 2023 | |
| INVENTOR(S) | : Adam Clayton Powell, IV et al. | |

It is certified that error appears in the above-identified patent and that said Letters Patent is hereby corrected as shown below:

In the Claims

Column 19, Line 47, Claim 14, replace "atho" with --a--
Column 19, Line 59, Claim 18, replace "the" with --The--
Column 20, Line 11, Claim 19, delete "preferentially"

Signed and Sealed this
Sixteenth Day of April, 2024

Katherine Kelly Vidal
*Director of the United States Patent and Trademark Office*